(12) United States Patent
Makk

(10) Patent No.: US 7,614,827 B1
(45) Date of Patent: Nov. 10, 2009

(54) SUBSURFACE DRIP IRRIGATION INSTALLER

(75) Inventor: Jose F. Makk, Las Cruces, NM (US)

(73) Assignee: Arrowhead Center, Inc., Las Cruces, NM (US)

( * ) Notice: Subject to any disclaimer, the term of this patent is extended or adjusted under 35 U.S.C. 154(b) by 263 days.

(21) Appl. No.: 11/741,655

(22) Filed: Apr. 27, 2007

Related U.S. Application Data

(60) Provisional application No. 60/795,997, filed on Apr. 27, 2006.

(51) Int. Cl.
*E02F 5/10* (2006.01)
(52) U.S. Cl. .................. 405/182; 405/183; 405/180
(58) Field of Classification Search ............... 405/182, 405/180, 181, 183, 174
See application file for complete search history.

(56) References Cited

U.S. PATENT DOCUMENTS

| | | | |
|---|---|---|---|
| 3,181,442 A | 5/1965 | Brigel | |
| 3,394,554 A | 7/1968 | Kinnan | |
| 3,523,425 A * | 8/1970 | Pierce, Jr. | 405/182 |
| 3,575,006 A | 4/1971 | Rugroden et al. | |
| 3,699,693 A | 10/1972 | Nelkin et al. | |
| 3,747,357 A | 7/1973 | Erickson et al. | |
| 3,917,426 A | 11/1975 | Wohlwend et al. | |
| 3,952,810 A | 4/1976 | Ulrich | |
| 4,087,982 A | 5/1978 | Golobay | |
| 4,260,290 A * | 4/1981 | Flippin | 405/182 |
| 4,463,509 A * | 8/1984 | Leonard | 405/182 |
| 4,685,832 A * | 8/1987 | Decker | 405/182 |
| 4,867,606 A | 9/1989 | Wright | |
| 5,039,252 A | 8/1991 | Schuermann | |
| 5,067,853 A * | 11/1991 | Radnis | 405/182 |
| 5,934,833 A | 8/1999 | Hunter et al. | |
| 6,234,718 B1 | 5/2001 | Moffitt et al. | |

* cited by examiner

*Primary Examiner*—Frederick L Lagman
(74) *Attorney, Agent, or Firm*—Deborah A. Peacock; Justin R. Jackson; Peacock Myers, P.C.

(57) ABSTRACT

A vibratory plow for installing a conduit below a ground surface. A portable vibrating compactor and a series of rollers provide a "seamless" finish to the ground.

37 Claims, 14 Drawing Sheets

SUBSURFACE DRIP IRRIGATION INSTALLER

CROSS-REFERENCE TO RELATED APPLICATIONS

This application claims priority to and the benefit of the filing of U.S. Provisional Patent Application Ser. No. 60/795,997, entitled "Vibratory Plow for Drip Irrigation," filed on Apr. 27, 2006, and the specification thereof is incorporated herein by reference.

BACKGROUND OF THE INVENTION

1. Field of the Invention (Technical Field)

The present invention relates to methods and apparatuses for installing conduit in a ground. More particularly, the present relates to a vibratory plow for installing the conduit in a ground with little disturbance to a surface of the ground.

2. Description of Related Art

Note that the following discussion refers to a number of publications by author(s) and year of publication, and that due to recent publication dates certain publications are not to be considered as prior art vis-à-vis the present invention. Discussion of such publications herein is given for more complete background and is not to be construed as an admission that such publications are prior art for patentability determination purposes.

Traditional vibratory plows that lay cable or flexible pipe generally result in substantial ground disturbance. Current designs also require significant power in order to force the plow blade through the ground. These types of vibratory plows are also disadvantageously very expensive.

U.S. Pat. No. 3,394,554 to Kinnan, entitled "Cable-Laying Apparatus", issued Jul. 30, 1968, discloses a cutting wheel and a blade to facilitate ground penetration and a hydraulic motor operatively coupled with the cutting wheel to impart vibratory motion thereto. Kinnan discloses a cable guide through which a cable is drawn and secured.

U.S. Pat. No. 3,952,810 to Ulrich, entitled "Slit Trenching and Cable Laying Device", issued Apr. 27, 1976, discloses a slit trenching and cable laying plow and a means for imparting a motion to the plow, forcing one side and then another side of the plow out of contact with the trench sides for reducing surface contact and resultant drag. A cover up wheel closes trenches. A separate hydraulic motor is powered by the tractor that powers the digging apart from powering the movement of the tractor, including features that permit the device to be easily driven by a low horsepower source.

U.S. Pat. No. 3,575,006 to Rugroden et al., entitled "Underground Cable Laying Apparatus", issued Apr. 13, 1971, discloses a blade member that is approximately 5' long, 8" wide and 1.25" thick and a vibrator secured to the blade member to substantially vibrate only the blade member, the remaining structure being isolated. Rugroden et al. also disclose a cable guide formed from a U-shaped channel member.

U.S. Pat. No. 4,087,982 to Golobay, entitled "Vibratory Plow", issued May 9, 1978, discloses a generally vertical elongated plow blade and a vibrator or shaker supported on the frame assembly. Golobay also discloses a cable supported on a drum that is received over suitable reels to a cable chute on the rear of the plow assembly.

U.S. Pat. No. 3,747,357 to Erickson et al., entitled "Vehicle for Underground Installation of Flexible Utility Lines and the Like", issued Jul. 24, 1973, discloses a plow assembly that includes a vertical plow blade and a plow blade shaker carried on the frame that acts to impart a purely vertical vibration to the vertical plow blade. A pair of ground wheels are journalled on the tamping wheel frame and a cable reel carrier is mounted on the frame.

U.S. Pat. No. 3,699,693 to Nelkin et al., entitled "Apparatus for Laying Underground Cable", issued Oct. 24, 1972, discloses a plow blade with extruding auxiliary plow blades and a commercially available vibrator unit secured to the plow assembly. The compacter blade responds to the vibrating action of the plow blade by compacting the soil immediately adjacent to the cable. The cable extends upwardly through the bottom of the plow blade and is fed from a cable reel which may be carried on the vehicle.

U.S. Pat. No. 3,699,693 to Schuermann, entitled "Cable Feed Assembly for Use With a Vibratory Plow", issued Aug. 13, 1991, discloses a vertically extending plow blade or shank and an oscillatory motion developing assembly. An appositive drive for a cable is fed through a cable guide structure, with the powered assist to the cable helping to assure a positive, relatively even feed and controlled advance of the cable.

There is thus a need for a vibratory plow that is lightweight and provides minimal ground disturbance when conduits are installed. While drip irrigation has been shown to reduce water consumption in many crops, including turf, change from a traditional sprinkler system to a drip system in short mown grass is not addressed adequately by existing technologies that utilize hand or heavy tractor trenching. Current technology consists of heavy machinery to install conduits underground, without considering disruption to the existing turf grass area.

BRIEF SUMMARY OF THE INVENTION

An embodiment of the present invention relates to methods and apparatuses for installing conduit in a ground. An embodiment of the present invention preferably includes a frame, a plow blade, a mount for removably attaching and detaching a self-contained, independently-operated, vibrating-plate compactor. The vibratory plow can include a hitch which is preferably a three-point hitch.

An embodiment of the present invention further includes at least one conduit spool assembly, wherein a plurality of plow blades are provided. Preferably, the present invention further comprises a plurality of conduit spool assemblies.

An embodiment of the vibratory plow preferably includes a plurality of closing wheels, positioned to force at least partially together at least an upper portion of a trench created in the ground by a plow blade. The plurality of closing wheels optionally comprises a pair of opposed closing wheels, which are preferably a plurality of pairs of closing wheels. The first pair of the closing wheels is preferably at a greater distance apart than a second pair of wheels. Most preferably, at least two pairs of closing wheels and a final compression roller are provided.

An embodiment of the vibratory plow preferably comprises at least one cutting wheel disposed in front of the plow blade, and a conduit line guide. An upper portion of the conduit line guide is preferably disposed at an angle of about 20 degrees to about 80 degrees with respect to a ground surface beneath the vibratory plow. The upper portion of the conduit line guide preferably resides at an angle of about 30 degrees to about 60 degrees with respect to the ground surface beneath the vibratory plow. Most preferably, an embodiment of the vibratory plow weighs about 250 pounds to about 500 pounds.

An embodiment of the vibratory plow further comprises conduit disposed on the conduit spool assembly and that conduit preferably comprises a substantially rectangular or square cross-section.

An alternative embodiment of the present invention is a plow having a frame, a plow blade, and a plurality of closing wheels disposed below the frame and positioned to at least partially close a trench formed by the plow blade. The plow preferably has a plurality of closing wheels that comprise a pair of opposed closing wheels. The plurality of closing wheels comprise a plurality of pairs of closing wheels, and a first pair of the wheels is at a greater distance apart than a second pair of the wheels. This plow also preferably comprises at least two pairs of wheels and a final single compression roller, wherein at least one of the closing wheels is preferably disposed substantially perpendicular to a ground surface and at least one of the closing wheels is disposed at an angle to a ground surface. This plow also includes at least one of the closing wheels disposed substantially parallel and at least one of the closing wheels is disposed at an angle with the vibratory plow blade. This embodiment of the present invention further comprises a removable and detachable vibrating-plate compactor and weighs about 250 to about 500 pounds.

The alternative embodiment of the present invention further includes a conduit line guide, wherein an upper portion of the conduit line guide is disposed at an angle of about 20 degrees to about 80 degrees with respect to a ground surface beneath the plow. An upper portion of the conduit line guide is disposed at an angle of about 30 degrees to about 60 degrees with respect to the ground surface beneath the vibratory plow. This embodiment further includes conduit fed into the conduit line guide, and the conduit is preferably a substantially rectangular or square cross-section.

An embodiment of the present invention is an apparatus for creating a trench in a length of ground and installing a length of conduit in the trench, including a frame having a front portion and a rear portion, at least one plow extending from the frame and engaging with the ground, the plow including a rotatable cutting portion, at least one pair of closing wheels disposed beneath the frame which trail behind at least one the plow and which exert a force on a surface of the ground, at least one compression roller disposed beneath the frame which trails behind the closing wheels; and a vibrating device releasably attached to the frame.

An embodiment of the present invention further includes a hitch member extending from the frame for attachment to a towing vehicle and a conduit line guide. The conduit line guide is preferably at non-perpendicular angle to the ground.

An embodiment of the vibratory plow preferably includes a vibrating device that is independently operable and a rotatable cutting portion disposed in front of the plow. The rotatable cutting portion creates a slit in the ground. The present invention further includes a spool assembly for holding conduit, which is preferably rectangular or square in cross-section. At least one wheel is preferably angled with respect to a longitudinal axis of the frame to provide a composite force to close the trench. A plurality of closing wheels is preferably provided and can include a plurality of pairs of closing wheels. In this embodiment, a first pair of the wheels is preferably at a greater distance apart than a second pair of the wheels and the present invention can include at least two pairs of rollers and a final single closing roller.

An embodiment of the present invention also provides a method for installing conduit beneath a ground surface including imparting vibrations from a self-contained, independently-operated, vibratory-plate compactor to a plow blade, disposing the plow blade in the ground and moving the plow blade in a forwardly direction to create a trench in the ground, disposing a conduit guide in the trench created by the plow blade, and passing conduit through the conduit guide and into the trench.

An embodiment of the method of the present invention can also include at least partially closing at least a portion of the trench with one or more closing wheels, wherein the plurality of closing wheels comprise a plurality of pairs of closing wheels, and wherein a first pair of the wheels is at a greater distance apart than a second pair of the wheels and at least two pairs of closing wheels and a final compression roller. The method of the present invention optionally includes providing conduit wherein the conduit can optionally have a substantially rectangular or square cross-section.

BRIEF DESCRIPTION OF THE SEVERAL VIEWS OF THE DRAWING

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1:
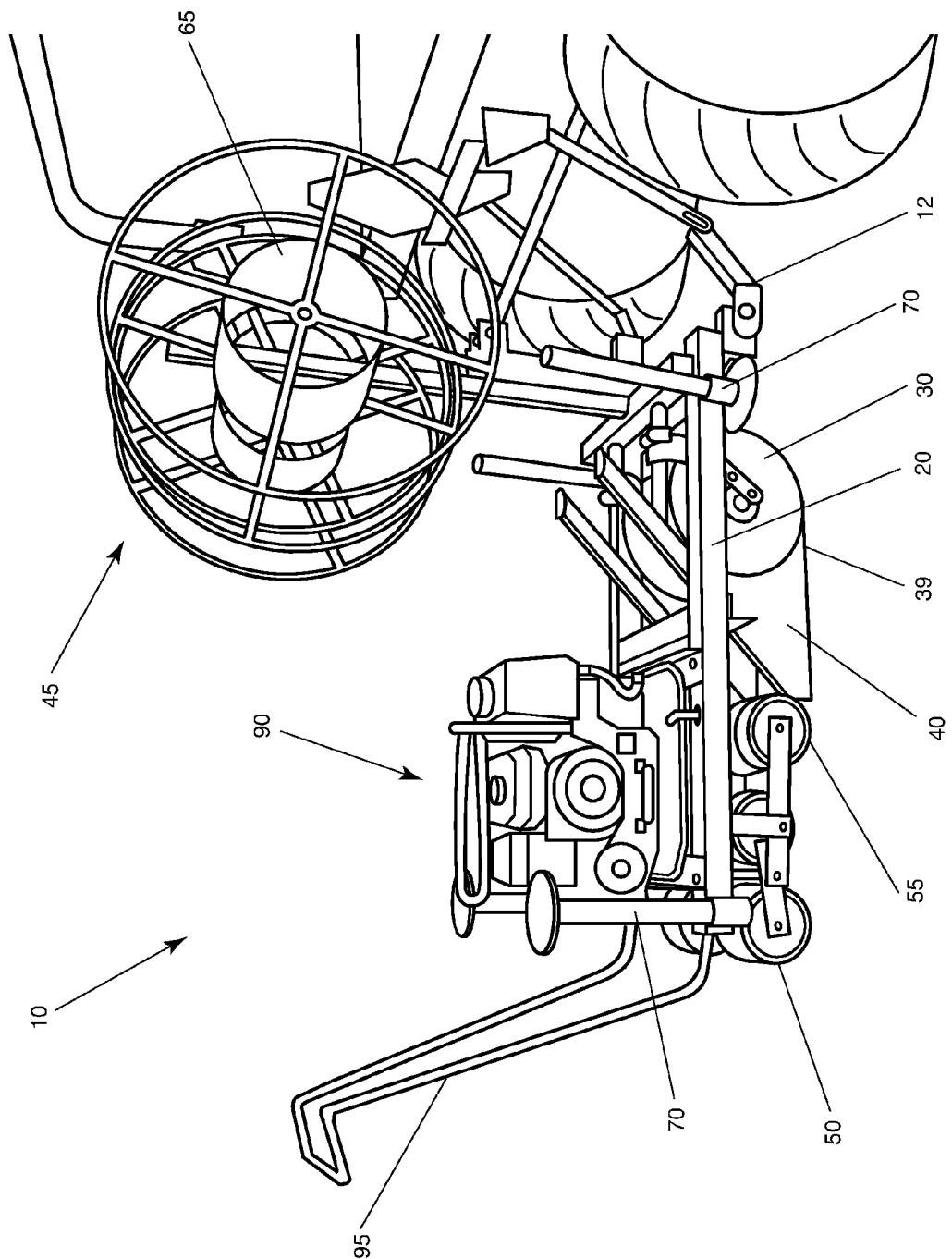
FIG. 1 is a side perspective view illustrating an embodiment of the apparatus of the invention with a handle of the vibratory-plate compactor extended.

Embodiments of the present invention relate to an apparatus for burying conduit into a ground using a vibratory plow. An embodiment of the present invention preferably comprises a plowing and discing apparatus, a compacting plate, compacting rollers, a vibratory apparatus, a conduit, and a frame to provide a lightweight unit that is easily drawn, preferably by a small tractor or alternately any vehicle. An alternative embodiment of the present invention further comprises a self-feed plow that inserts any kind or combination of conduits underground and leaves minimal surface disruption.

The term "conduit" as used throughout the specification and claims is intended to include not only conduit, but also cables, lines, conductors, hoses, tubes, pipe, and any other at least partially flexible material which a user desires to be buried, as well as combinations thereof.

The term "disc", as used throughout the specification and claims, means a relatively thin and at least partially flat, substantially circular object or plate. The term "trench" as used throughout the specification and claims, means a furrow, ditch, slit, cut, and combinations thereof.

A prime mover vehicle, such as a light weight tractor, preferably puts into motion or pulls embodiments of the present invention. A vibratory plate compactor or other vibratory device preferably reduces the forward and/or downward forces needed to insert a conduit into the ground, thereby reducing the pulling and tearing exerted by the prime mover on the surface of the golf green or other landscape. The vibratory plate compactor preferably also flattens and compacts trench ridges, clods, or any obstructions left by the plow after a conduit is installed. The vibration also helps soil particles to move and thus one does not need heavy rollers or a heavy apparatus.

An embodiment of the present invention preferably works in conjunction with a small tractor, which is lightweight and has high maneuverability, and a vibratory plate compactor, a tool used by pavers and patio installers. One or more compaction wheels or rollers preferably comprise a strong material, including but not limited to steel, iron, or other materials, including but not limited to hard rubber, steel, or any other durable material. The wheels and rollers are preferably disposed beneath the plate compactor to aid further in compressing disrupted soil. The present invention preferably comprises a plurality of axles, and preferably more axles if installing larger diameter conduit. At least one compression roller preferably applies a compressive force over the ground. The closing wheels preferably provide for a composite force, comprising a plurality of linear sets of wheels, with preferably a first set comprising one or more wheels, disposed widely apart, providing a pressure from outside. Another set of linear wheels, comprising one or more wheels, are preferably disposed adjacent to the first set of wheels, preferably more closely spaced. Another set of wheels, comprising at least one wheel is disposed adjacent to the first set of wheels. The plurality of wheels provide a horizontal as well as vertical compressive "zipping" force, much like closing a "wound" and preferably closing trenches, holes, or other openings in the ground with only a minimal amount of surface disruption, bulging, and/or scarring.

An embodiment of the present invention further comprises a rotatable cutting or slicing blade, preferably circular, that slits the ground. The wheel preferably is compressively held by friction provided by particles in the ground and does not require a large force in a downward direction. An embodiment of the present invention comprises conduit installed at preferably an angle of between approximately 90 and 10 degrees to the ground, more preferably between approximately 80 and 20 degrees to the ground, and most preferably between approximately 60 and 30 degrees to the ground. The drawings illustrate an approximate 45° angle. With these angles there are no kinks or breaks in the conduit during installation. The cutting or slicing disc preferably rotates and deflects after contacting any hard object such as a stone. An embodiment of the present invention preferably leaves an approximately invisible slit and preferably provides for a relatively seamless surface quality. An embodiment of the present invention results in a cut in the ground approximately 1" to 8" in depth.

An embodiment of the present invention preferably inserts or lays conduit underground wherein the soil, sand, or clay particles of the ground preferably hold the conduit in place in the ground. Embodiments of the present invention preferably allow a smaller, less disruptive trench size. The present invention preferably installs a conduit that resides substantially linear when installed and thus remains straight, reducing the likelihood of a rupturing or breaking of the conduit. The present invention preferably installs a plurality of lines simultaneously.

A preferred apparatus of the present invention preferably includes a vibratory plate or any other vibratory apparatus. The vibratory plate is preferably disposed above to the plurality of closing wheels and preferably precludes the need for heavy weights. The vibratory plate apparatus preferably provides for movement of particles underground and preferably prevents uneven compaction due to 'soft' spots or other irregularities. The vibratory plate is preferably easily attached or detached from any platform upon which it is disposed. A standard vibratory plate compactor is easily detached or attached to the present invention. Vibratory plate compactors have been proven to be an effective means to compact and settle soils, and effectively and efficiently replaces a weight that provides a downward compacting force due to weight. The apparatus more easily accomplishes the cutting of the grass and soil, reduces the friction of the soil against the trenching plow shank, and improves the closing and compacting of the slit after the conduit is installed.

The apparatus preferably includes a hitch, which is most preferably a three-point hitch. In one embodiment, a top portion of the hitch is preferably adjustable to be more closed or less closed, and most preferably includes a piston. Preferably the tractor or other drive mechanism of apparatus provides a mechanism, such a hydraulic system that permits the apparatus to be lifted and thus transported without interacting with a ground thereunder. The three point hitch is preferably laterally controlled, able to lift, and does not tip over from the top.

Referring now to FIGS. 1-8, an apparatus of an embodiment of the present invention is indicated generally at 10. Apparatus 10 preferably includes frame 20. One or more sets of compression rollers 50 are preferably provided. One or more sets of closing wheels 55, 55' are also preferably provided and are most preferably rotatably attached to respective members extending downwardly from frame 20. Closing wheels 55, 55' are preferably disposed in a plurality of pairs and each wheel of each pair is preferably spaced apart by a predetermined distance from the respective wheel of each pair. Further, in a most preferred embodiment, one or more pairs of wheels 55, 55' which are disposed closer to a lead portion of frame 20, are most preferably spaced apart by a greater distance than are the one or more pairs of wheels 55, 55' which are disposed closer to the trailing portion of frame 20, best seen in FIG. 3 (and FIG. 11).

Although wheels and rollers 55 and 50 are most preferably round structures or wheels which rotate, as used throughout the specification and claims, the terms "wheels" and/or "rollers" are used independently herein and can include any shape known to be capable of traveling along a ground surface. By way of inclusion and not limitation, the terms "wheels" and "rollers" can thus include a foot or skid plate, for example, similar to those used in portable soil compactors.

Apparatus 10 is preferably supported in a stationary mode by stabilizing legs 70, which are releasably and reversibly attached to frame 20. At least one plow 39 extends from frame 20 and preferably includes rotatable cutting disc 30 disposed adjacent to frame 20 and trenching plow shank 40 disposed rearwardly of cutting disc 30. Cutting disc 30 is preferably rotatably attached to one or more arms 75 extending from frame 20. Hitch 12, such as the three-point hitch illustrated in the Figures, preferably attaches apparatus 10 to any vehicle, such as tractor 35 or the like, for propelling apparatus 10 during operation. Hitch 12 is preferably attached to vehicle 35 via any fastening mechanisms or manners known to those skilled in the art. Alternatively, of course, one or more self-powering mechanisms can be provided, thus enabling embodiments of the present invention to be provided as a "walk-behind" configuration (FIG. 12) or as a unit which can be ridden and or operated by a driver (FIG. 13). With a three-point hitch, there is lateral control, the apparatus can be lifted for hauling and the apparatus won't tip at the top.

Figure 2:
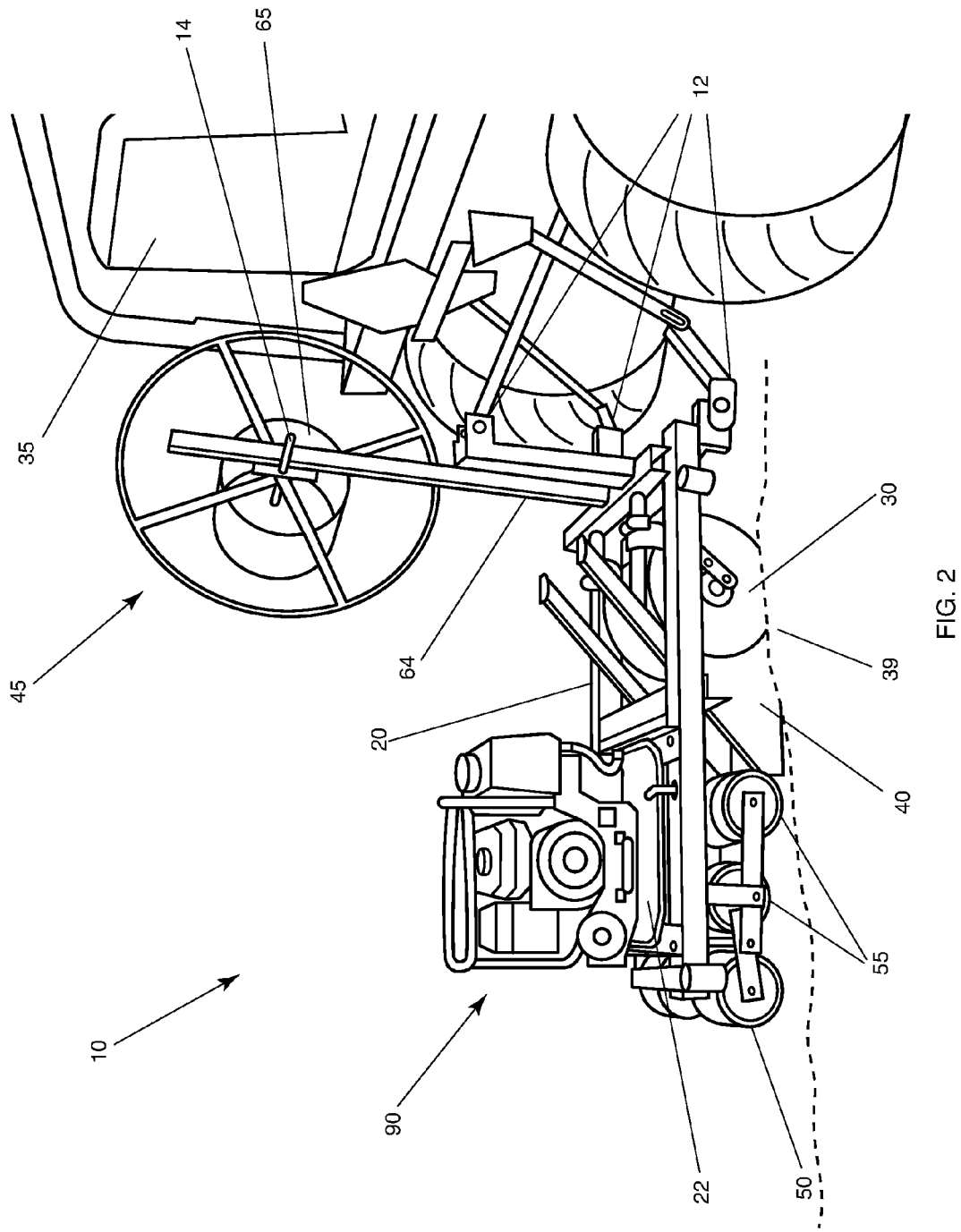
FIG. 2 is a side perspective view of the apparatus of FIG. 1 with the rotating cutting disc is cutting into a surface of the ground.
Figure 3:
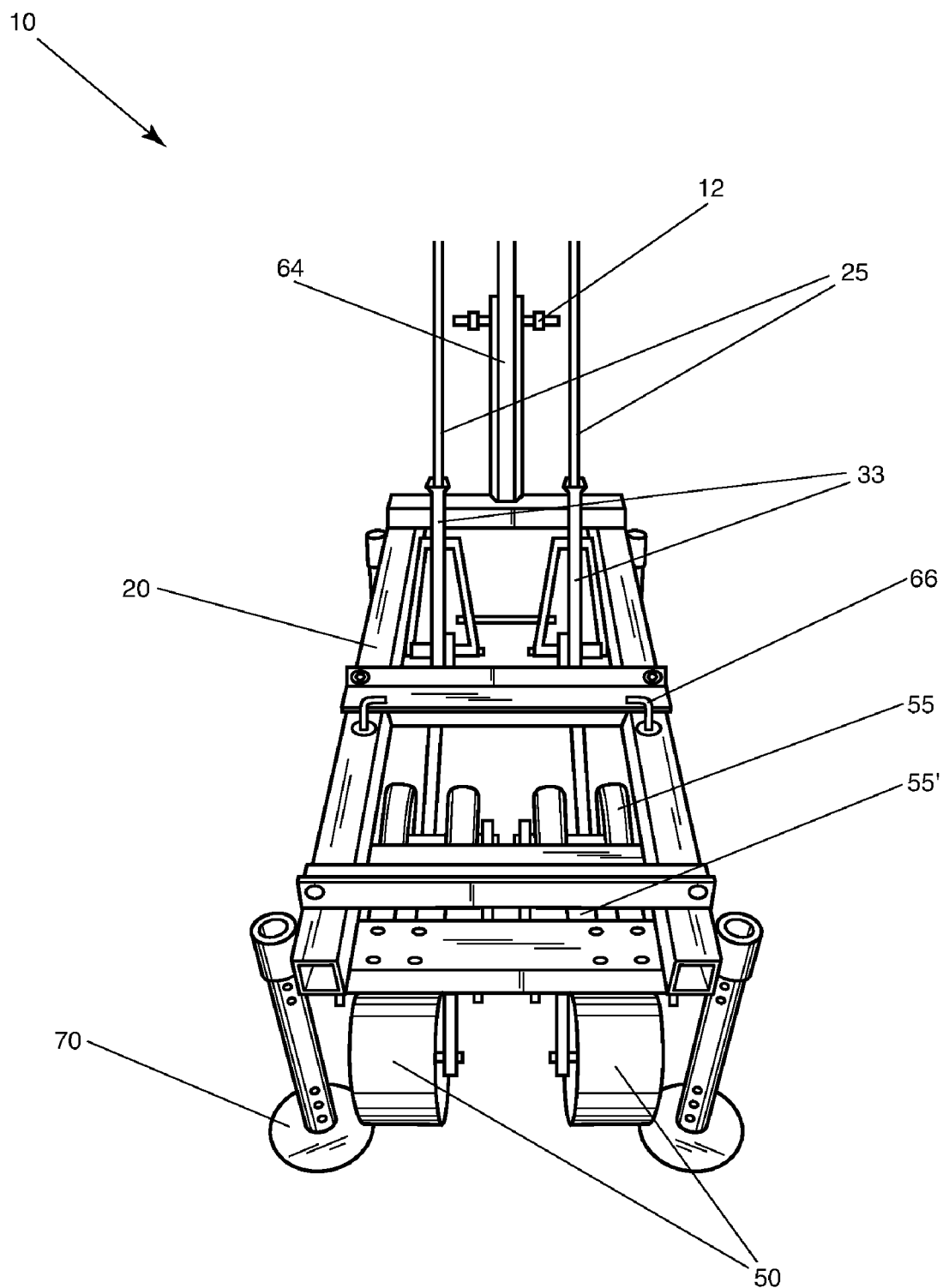
FIG. 3 is a rear perspective view of the apparatus of FIG. 1.

Vibration device 90, which is preferably an independently operable standard off-the-shelf compactor, tamper, vibrator, or the like, is preferably removably attached to frame 20, such as by fasteners 66 or other fasteners. In a preferred embodiment, vibratory device 90 may be removed and put back easily onto frame 20. This is useful when vibratory device 90 is needed for other applications (e.g. for other landscaping projects) when the vibratory device can be used for sidewalk and patio preparation. Those skilled in the art will appreciate that vibration device 90 may be attached to virtually any portion of frame 20. Handle 95 is removably attached to vibration device 90. FIG. 1 shows handle 95 in an extended position. FIG. 2 shows handle 95 removed from vibration device 90.

Vibration device 90 may include compactor plate 22 that engages with frame 20 and fasteners 66, thus permitting vibrations from device 90 to be transferred through frame 20 to plow 39 and plow shank 40. At least one spool assembly 45 that includes bobbin 65 is preferably rotatably disposed, such as by axle 14 (best seen in FIG. 2), on support 64 that extends upwardly from frame 20.

At least one supply of conduit 25 is preferably fed from spool assembly 45 through hollow line guides 33 disposed on frame 20. A typical roll of conduit is 1000-2000 long, but any length may be utilized. Preferably, compression rollers 50 are substantially longitudinally aligned with line guides 33. Conduit 25 can comprise a rectangular cross-section or any other cross-sectional shape suitable for installing in a trench, as will be appreciated by those skilled in the art. Rectangular or square cross-section conduit is preferably used in order to accommodate a smaller trench size, have a more secure installation (e.g. with round conduit, there is more dirt/particle fill in and movement). Typical conduit, such as ¾" by 1¼" may be utilized. Preferably, an end of line guide 33 adjacent to plow 39 includes guiding insert 73 for directing conduit 25 during operation of apparatus 10, best seen in FIG. 6. Although metal and/or ceramic guiding inserts 73 can be used and will provide desirable results, guiding insert 73 is most preferably made from a plastic-type of material, such as nylon or another plastic. Although guiding insert 73 is illustrated as comprising a partially curved surface, those skilled in the art will appreciate that insert 73 can comprise a number of shapes, including but not limited to a rotatable-disposed round wheel-type shape, and still achieve the intended function of guiding conduit 25 into a lower portion of a trench.

FIGS. 1-3, 5 and 6 best illustrate a dual system in which two conduits are fed from two spool assemblies and there are two sets of rollers/wheels, two disks and plow blades. The invention may have a single conduit system or any multiple.

Figure 7:
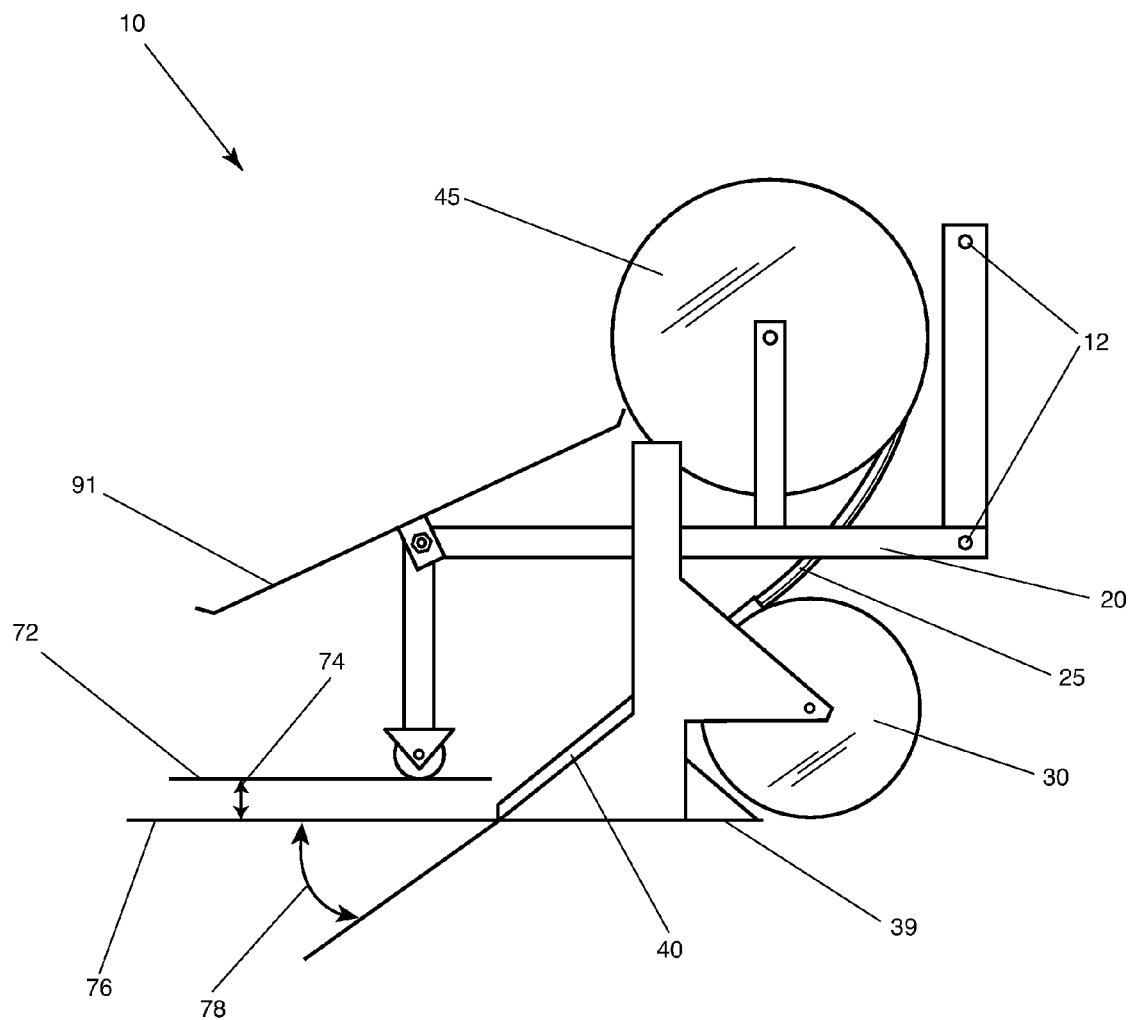
FIG. 7 is a side view drawing on an enlarged scale showing an embodiment of the invention wherein conduit is passing out of a line guide.

FIG. 7 illustrates a schematic side view of vibratory plow 10 of an embodiment of the present invention comprising spool assembly 45 dispensing conduit 25 adjacent to cutting disc 30. Alternatively, retractable base 91 is hingedly attached to frame 20 for attachment of a vibration device to frame 20. Apparatus 10 is preferably advantageously light in weight, and one preferred embodiment weighs approximately 200 to 500 pounds, and most preferably 250-350 pounds, which allows operation of apparatus 10 without substantially disturbing and/or damaging a surface of a ground while in use.

Figure 4:
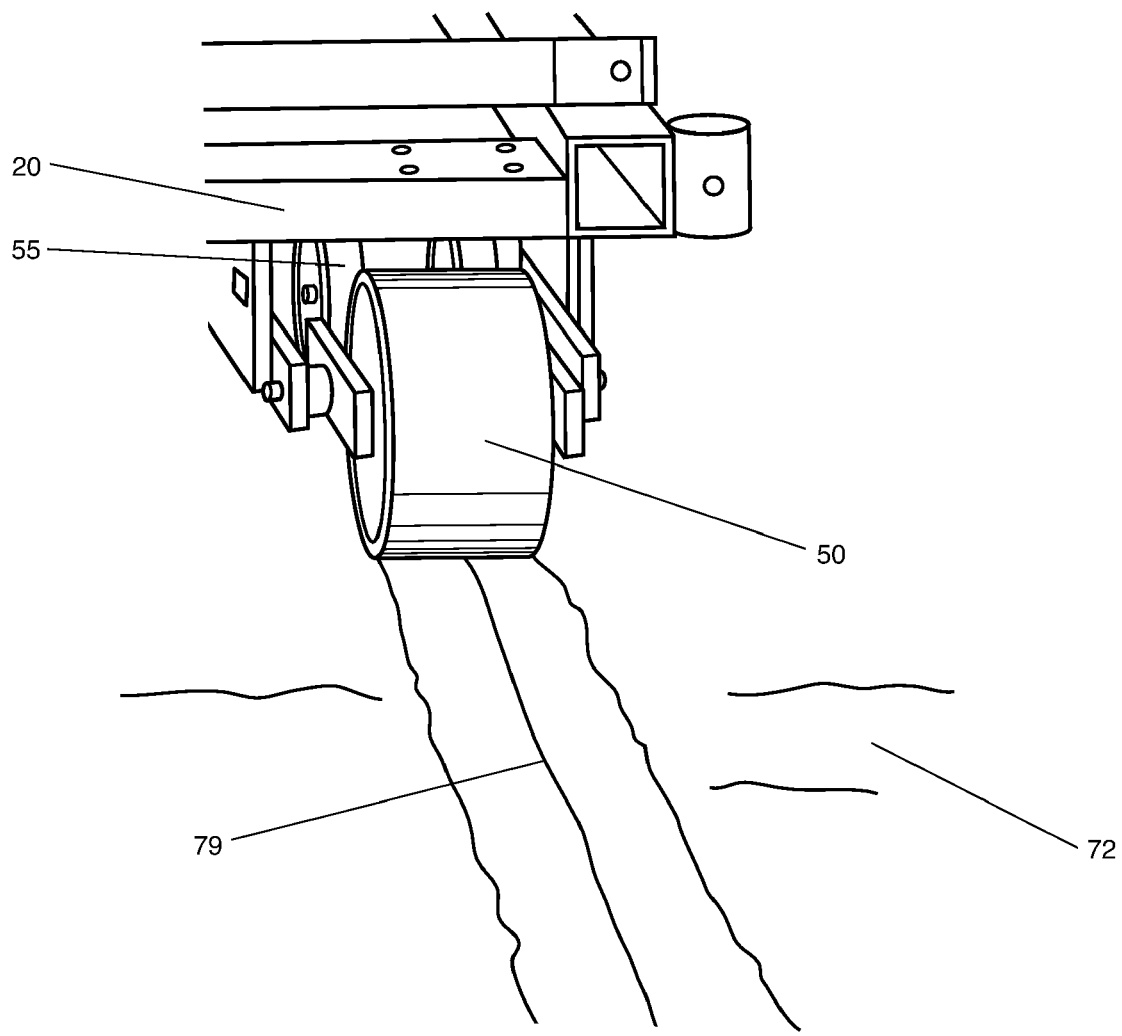
FIG. 4 is a rear perspective view of the apparatus of FIG. 1 which illustrates the condition of turf after installing a conduit.
Figure 5:
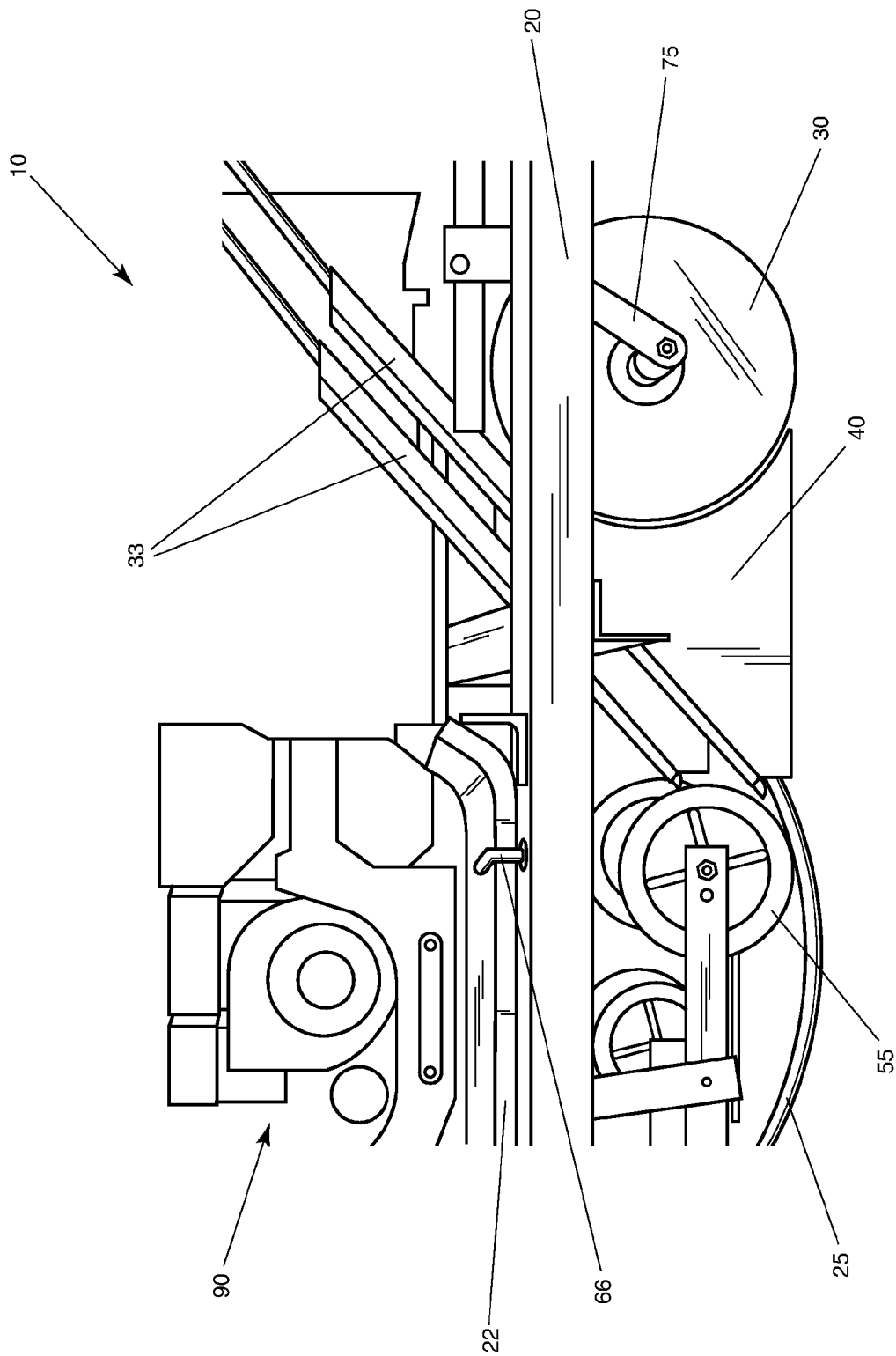
FIG. 5 is a side view of an embodiment of the apparatus of FIG. 1.
Figure 6:
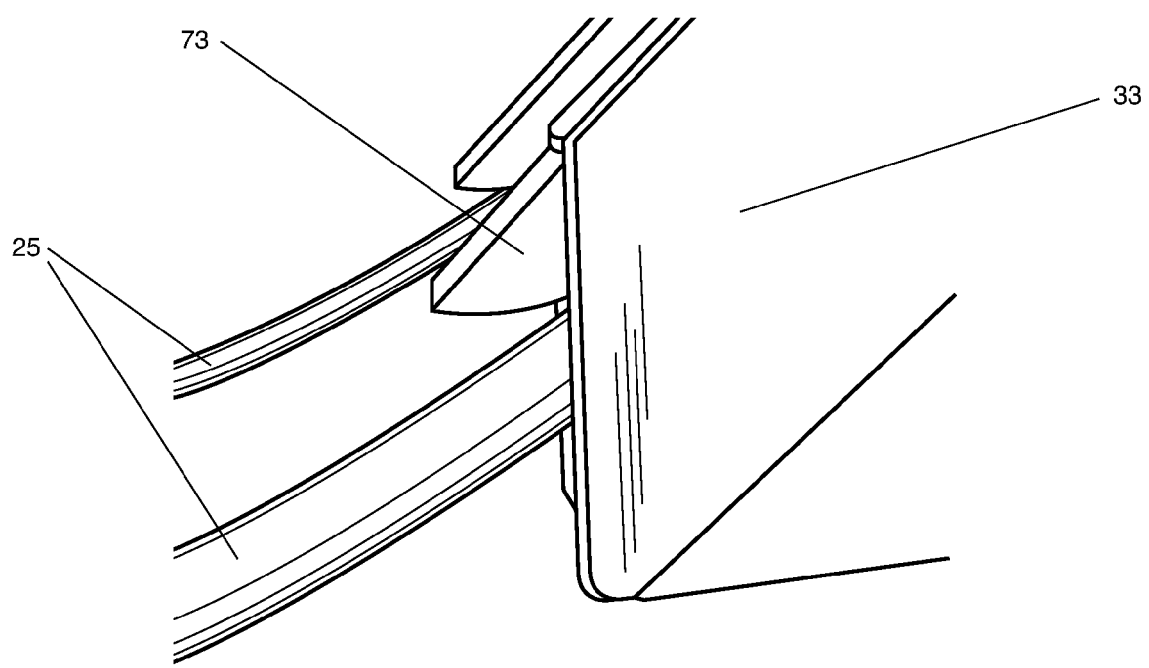
FIG. 6 is a side view drawing of an embodiment of the present invention.
Figure 8:
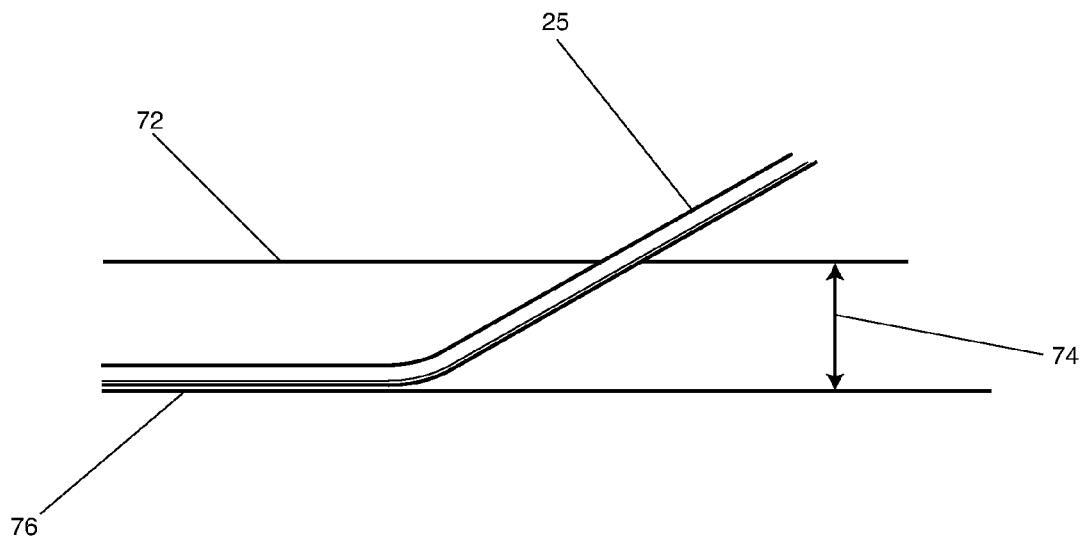
FIG. 8 is a partial cross-sectional view of conduit lying in the bottom of a trench.

In operation of apparatus 10, vehicle 35 preferably moves apparatus forward and hitch 12 is preferably caused to be lowered so that plow 39 is lowered to a trench level 76 beneath ground level 72, disposing at least a portion of conduit 25 below and substantially parallel to ground level 72, as is best illustrated in FIG. 8. The distance between ground level 72 and trench level 76 is indicated by an arrow 74. As cutting disc 30 and trenching plow shank 40 create the trench to trench level 76, conduit 25 is laid into the trench down to at or near trench level 76 at an angle with respect to the trench level, indicated by arrow 78 (see FIG. 7). As apparatus 10 moves forward, a first row of closing wheels 55 preferably provide a substantially horizontal downward force adjacent the trench thus at least partially forcing surface disturbance ridges, created by rotating cutting disc 30 and trenching plow shank 40, together. A second set of closing wheels 55, which as previously stated are preferably closer to one another than the first set of closing wheels 55, helps to close at least a surface of the trench even more. Lastly, compression roller or rollers 50 provide a vertical downward force to smooth the surface of ground 72 after conduit 25 is laid in the trench. FIG. 4 shows roller 50 compacting ground level 72 directly above trench cut 79, thus illustrating the relatively minor disturbance left in a ground surface after apparatus 10 has disposed conduit 25 therebelow. In addition, vibration device 90 is preferably operated to augment the forces provided by wheels 55 and rollers 50. Apparatus 10 preferably applies pressure forces selectively and in composite directions, and uses vibration instead of direct pressure forces as a means to relocate soil particles.

Figure 9:
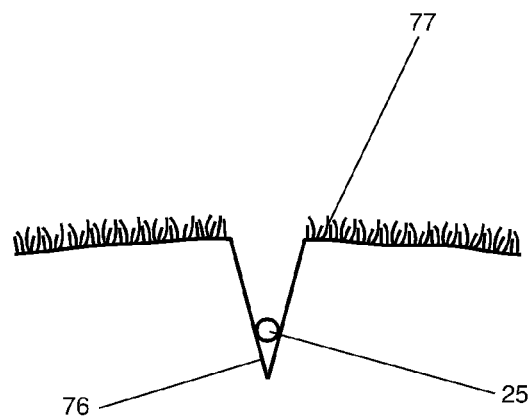
FIG. 9 is a partial cross-sectional schematic view of a conduit installed in a slit or trench cut in the ground.

There is shown in FIG. 9 a partial cross-sectional view of conduit 25 lying in the bottom of the trench made by disc 30 and trenching plow shank 40 of apparatus 10. The closing and leveling of the trench left by the trenching plow shank is a process that requires forces in several directions produced by rolling wheels, in addition to a downward force from compression rollers. The downward force resulting from the reduced weight of the compression roller is augmented by the closing forces from rolling wheels. The trench is generated by a primary force working horizontally to open the trench by a force operating horizontally left and right of cutting disc 30, plow 39, and/or plow shank 40. Elevation of edges 77 of trench are generated as a secondary effect of the primary cutting force. Displaced soil particles are displaced upward due to the retaining pressure of the surrounding soil. The pressure down is supplied from closing wheels 55, starting from a certain distance from the closure point, closing on the trench and finally smoothing it with compression roller 50, resulting in a "zipper" effect. Under this gradual pressure the grass, thatch, or turf on the surface of the soil extends toward the closing of the trench.

Figure 10:
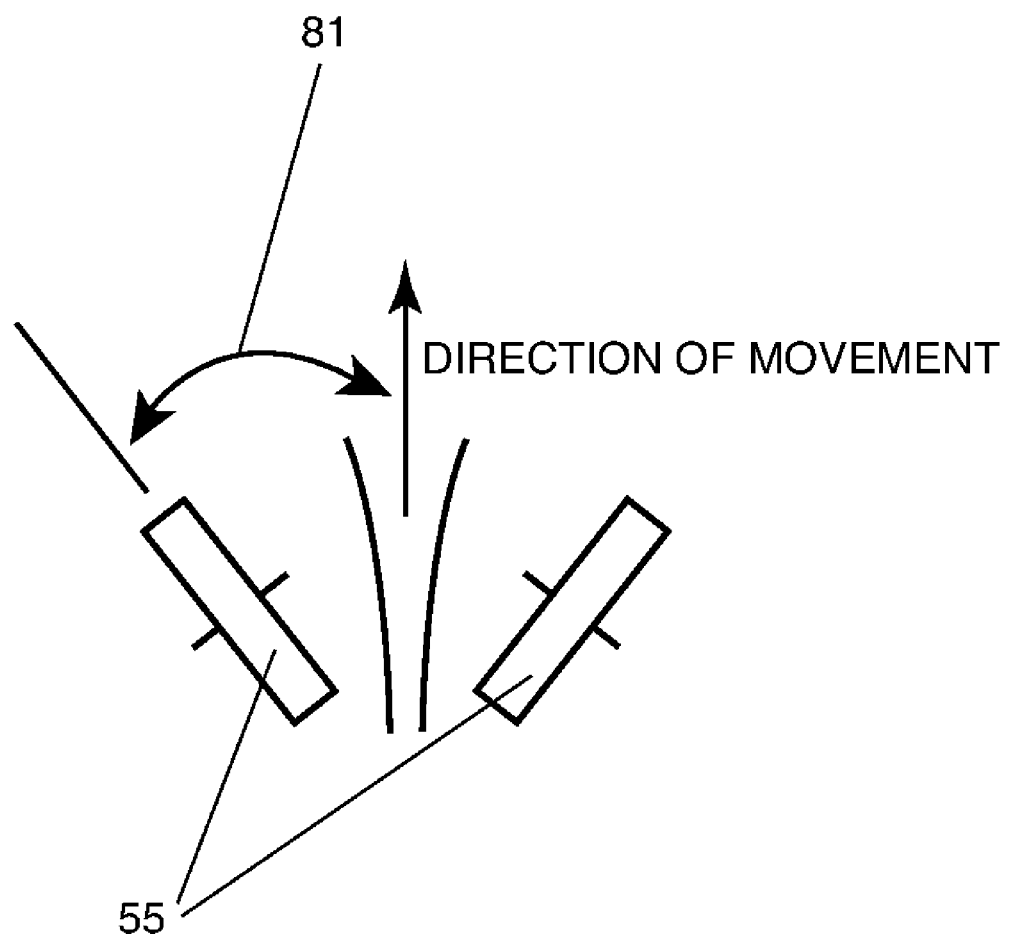
FIG. 10 is a schematic plan view of a trench made by an embodiment of the present invention.

FIG. 10 shows a plan view of an alternative embodiment of apparatus 10 and the trench made by the disc and trenching plow shank of the present invention. Wheels 55, 55' closes the trench, after conduit 25 is laid, as apparatus 10 travels forward. Axis of wheel 55, 55' is preferably disposed at an angle to the vertical, indicated by an arrow 81, to impart a closing effect through the force wheel 55, 55' against the ground. When wheel 55, 55' moves in the direction of advance, the final result on the surface of the wheel 55, 55' is a pressure with two components, i.e. a downward force at the point of wheel-ground contact and a lateral force that pushes the surface to one side that consequently pushes the axis-wheel to the left. Two wheels 55. 55' disposed side by side with axes at opposite angles produce a neutralized lateral force and the resulting force on the surface is a closing force on the trench, completing the "zipper" effect.

Apparatus 10 is most preferably used to install conduit, especially drip irrigation lines, under established short-mown turf grass canopies, golf greens, grass tennis courts, bowling greens, small gardens, or alternately under any landscape. Apparatus 10 is particularly useful when a "seamless" effect is needed after the conduit installation.

Figure 11A:
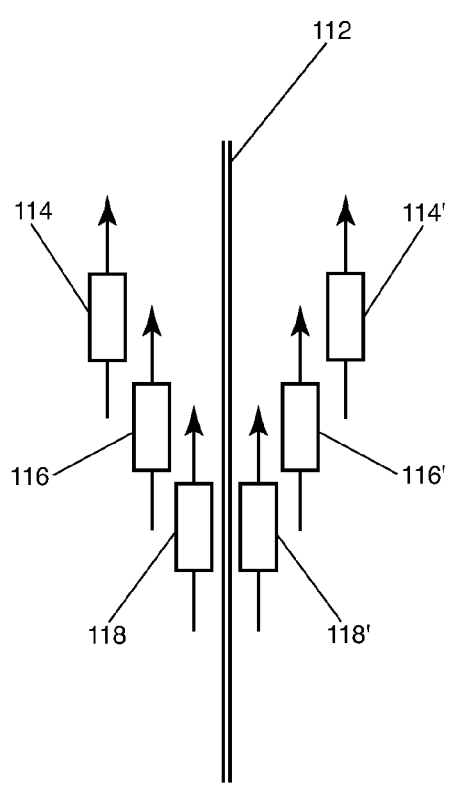
FIGS. 11A, 11B, and 11C, are schematic views illustrating wheel configurations according to embodiments of the present invention.

FIG. 11A schematically illustrates a bottom view of an embodiment of the present invention wherein a plurality of sets of closing wheels are disposed in a sequentially narrowing configuration with respect to trench 112. In this embodiment, one or more of closing wheels are preferably disposed substantially perpendicular with the ground upon which they traverse. Although a plurality of sets of sequentially narrowing closing wheels are illustrated, any number, including just one set of closing wheels can be provided and produces desirable results. First set of wheels 114, 114', are furthest apart and provide pressure during installation of the conduit. Second set of wheels, 116, 116' provide further pressure and narrow at least an upper portion of the trench. Final closing wheels 118, preferably finish closing the trench.

Figure 11B:
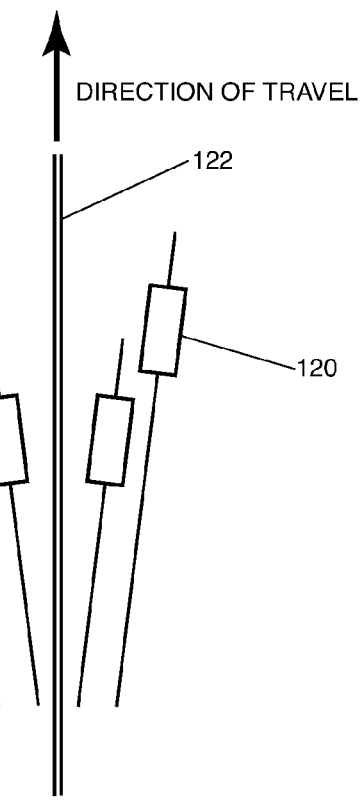

FIG. 11B schematically illustrates a bottom view of an embodiment of the present invention wherein a plurality of sets of closing wheels 120 are disposed in a sequentially narrowing configuration with respect to trench 122. In this embodiment one or more of closing wheels 120 are preferably disposed such that they reside substantially perpendicular with the ground upon which they traverse, however, one or more of wheels 120 are preferably turned slightly away from trench 122. As described as to FIG. 11A, the wheels sequentially help to provide pressure and close the trench. Although a plurality of sets of sequentially narrowing closing wheels 120 are illustrated, any number, including just one set of closing wheels 120 can be provided and produces desirable results.

Figure 11C:
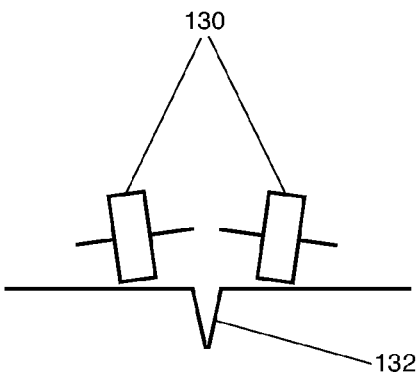

FIG. 11C schematically illustrates a front view of an embodiment of the present invention wherein one or more closing wheels 130 are disposed at an angle which is not perpendicular with the ground upon which they traverse, thus closing trench 132. Although only two closing wheels are illustrated in this figure, a plurality of sets of closing wheels 130 can be provided which are sequentially narrowing.

Figure 12:
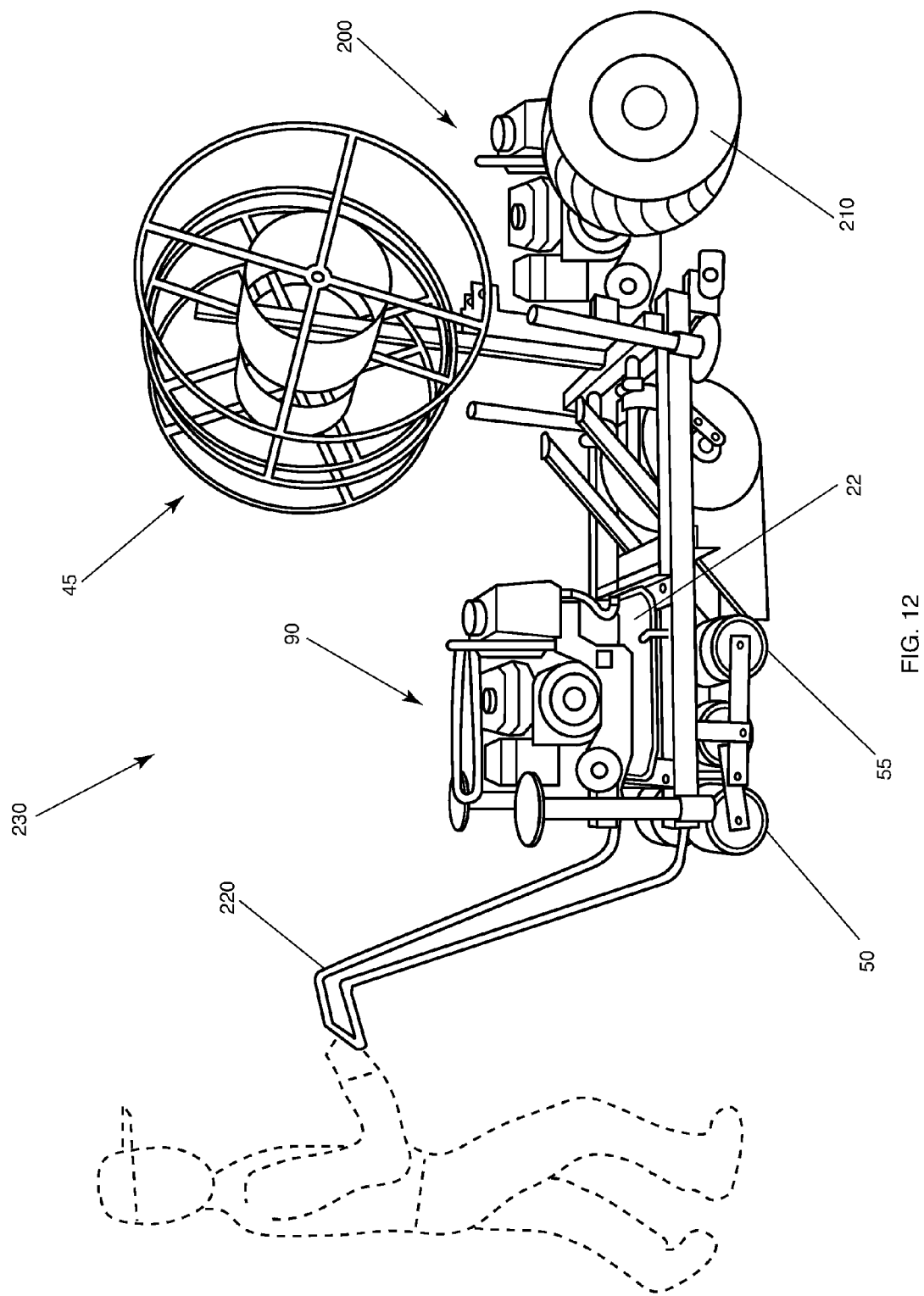
FIG. 12 is a perspective view drawing illustrating a walk-behind vibratory plow according to an embodiment of the present invention.
Figure 13:
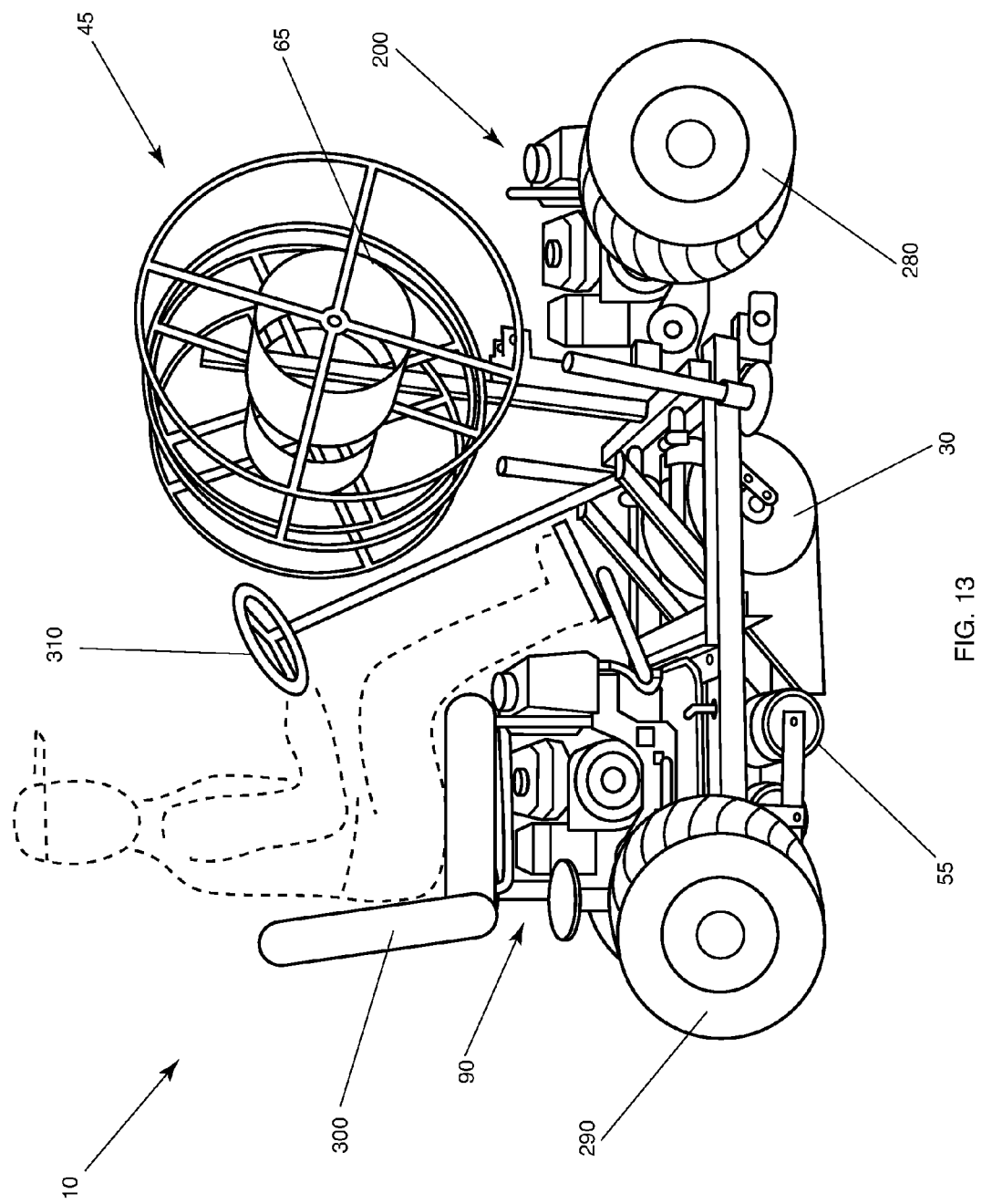
FIG. 13 is a perspective view drawing illustrating an operator-driven vibratory plow according to an embodiment of the present invention.

FIG. 12 illustrates an embodiment of the invention in which a user walks behind the apparatus of the invention. In this embodiment, motor/engine 200 preferably provides power to drive wheels 210. Controls for engine 200 and for engaging and disengaging drive wheels 210 are preferably provided at or near handles 220 which handles a user preferably grasps while walking behind apparatus 230 This is possible because of its self-powered drive wheels.

FIG. 13 illustrates an embodiment of apparatus 260 wherein motor/engine 200 preferably provides power to front wheels 280 and/or rear wheels 290. In this embodiment, seat 300 and steering control unit 310 is preferably provided. A user can thus sit in seat 300 and control steering control unit 310, as well as with one or more throttle control units (not shown).

Figure 14:
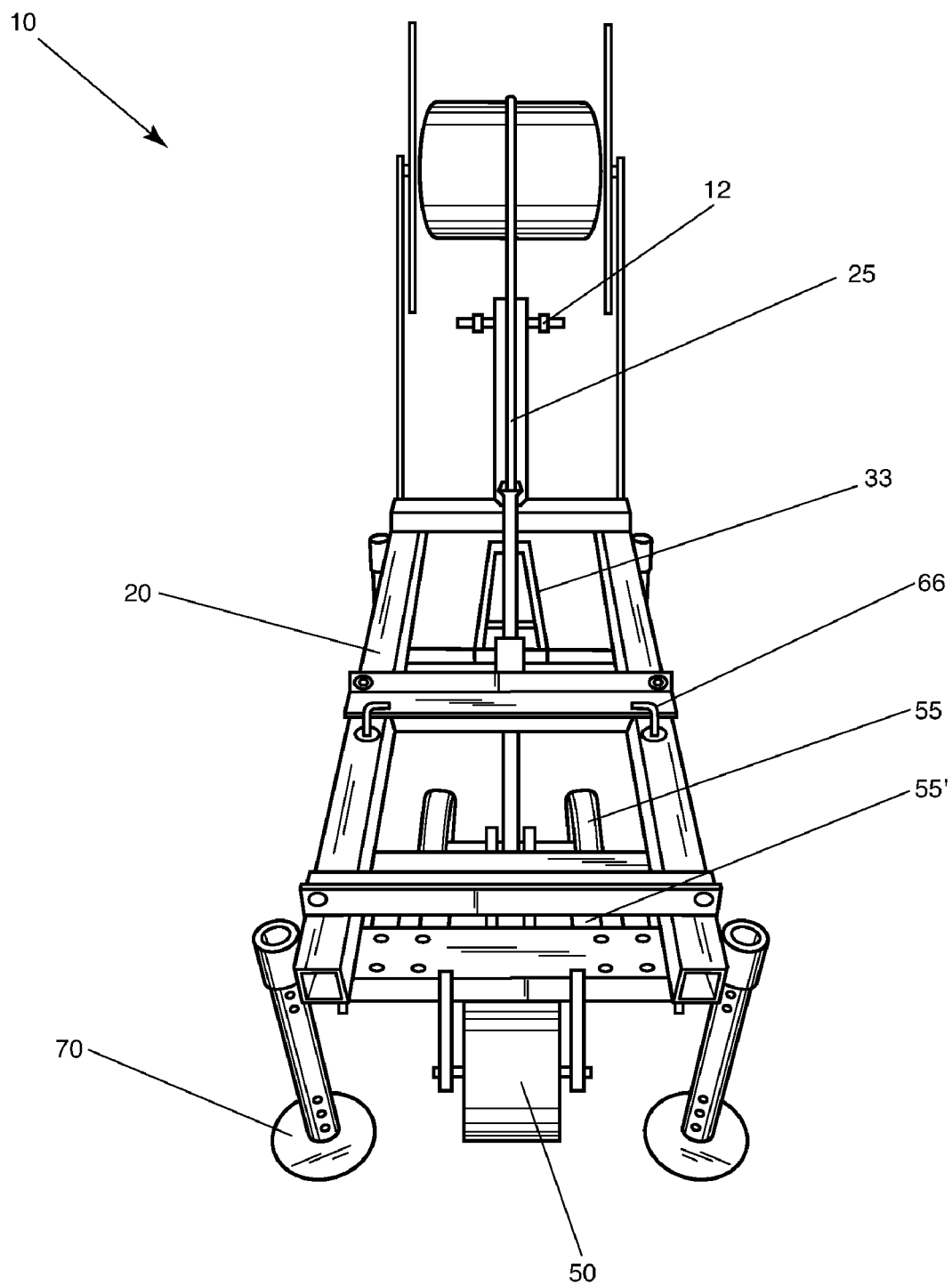
FIG. 14 is a drawing illustrating an embodiment of the present invention adapted to install a single conduit.
Figure 15:
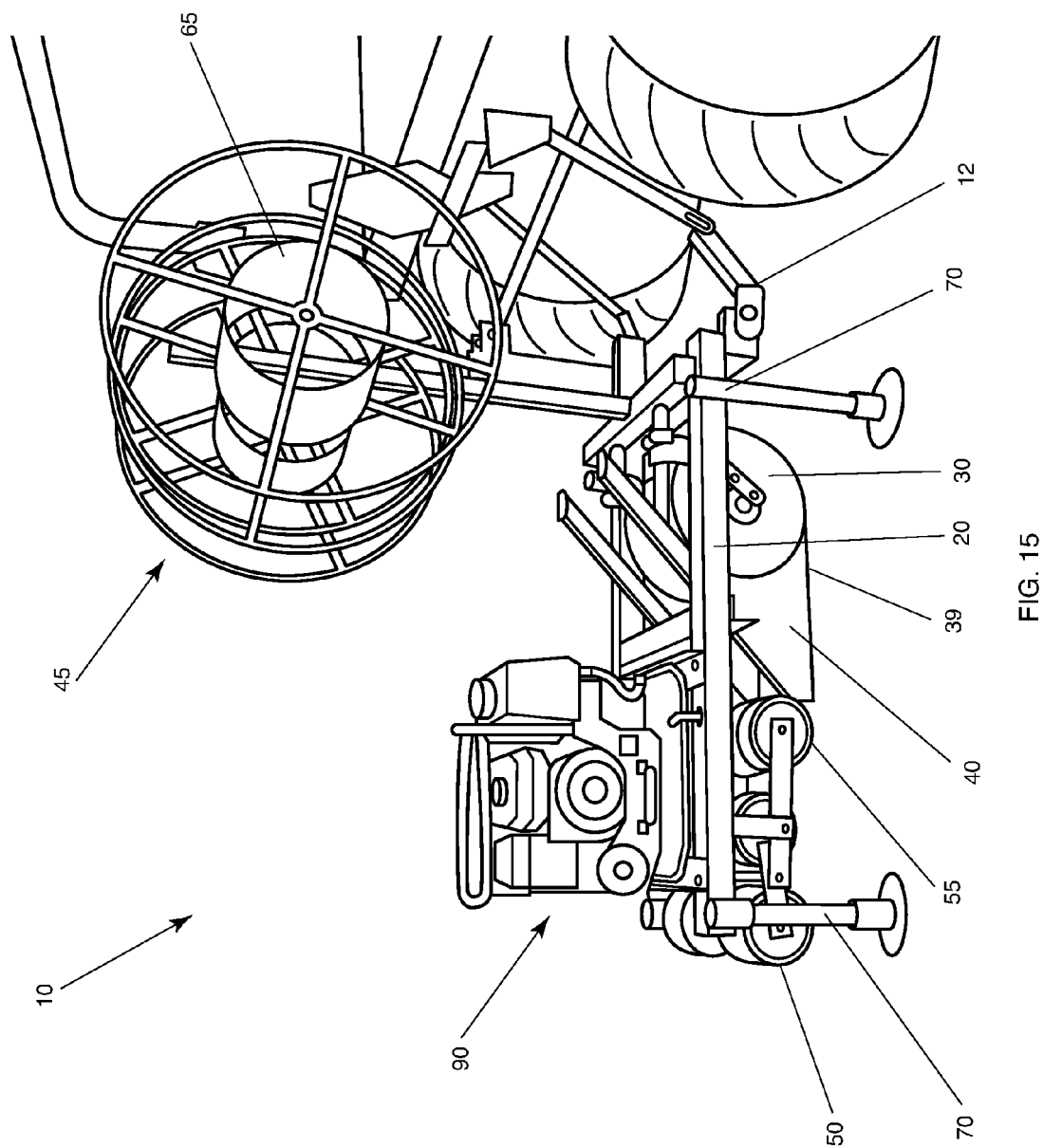
FIG. 15 is a drawing illustrating an embodiment of the present invention in a raised position.

FIG. 14 shows an embodiment of apparatus 320 in which a single line of conduit is installed. Other multiples of conduit, such as 1, 2, 3, or more, may be installed in accordance with the present invention.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above and/or in the attachments, and of the corresponding application(s), are hereby incorporated by reference.

What is claimed is:

1. A vibratory plow comprising:
   a frame;
   a plow blade;
   a mount for removably attaching and detaching a self-contained, independently-operated, vibrating-plate compactor.

2. The vibratory plow of claim 1 further comprising a hitch.

3. The vibratory plow of claim 2 wherein said hitch comprises a three-point hitch.

4. The vibratory plow of claim 1 further comprising at least one conduit spool assembly.

5. The vibratory plow of claim 4 further comprising conduit disposed on said conduit spool assembly.

6. The vibratory plow of claim 5 wherein said conduit comprises a substantially rectangular or square cross-section.

7. The vibratory plow of claim 1 comprising a plurality of plow blades.

8. The vibratory plow of claim 7 further comprising a plurality of conduit spool assemblies.

9. The vibratory plow of claim 1 further comprising a plurality of closing wheels, positioned to force at least partially together at least an upper portion of a trench created in a ground by said plow blade.

10. The vibratory plow of claim 9 wherein said plurality of closing wheels comprise a pair of opposed closing wheels.

11. The vibratory plow of claim 10 wherein said plurality of closing wheels comprise a plurality of pairs of closing wheels, and wherein a first pair of said wheels is at a greater distance apart than a second pair of said wheels.

12. The vibratory plow of claim 11 comprising at least two pairs of closing wheels and a final compression roller.

13. The vibratory plow of claim 1 further comprising at least one cutting wheel disposed in front of said plow blade.

14. The vibratory plow of claim 1 further comprising a conduit line guide.

15. The vibratory plow of claim 14 wherein an upper portion of said conduit line guide is disposed at an angle of about 20 degrees to about 80 degrees with respect to a ground surface beneath said vibratory plow.

16. The vibratory plow of claim 15 wherein said upper portion of said conduit line guide resides at an angle of about 30 degrees to about 60 degrees with respect to the ground surface beneath said vibratory plow.

17. The vibratory plow of claim 1 wherein said vibratory plow comprises a weight of about 250 pounds to about 500 pounds.

18. The apparatus of claim 1 wherein said vibrating device is independently operable.

19. A plow comprising:
a frame;
a plow blade;
a plurality of closing wheels disposed below said frame and positioned to at least partially close a trench formed by said plow blade; and
a removable and detachable vibrating plate compactor.

20. The plow of claim 19 wherein said plurality of closing wheels comprise a pair of opposed closing wheels.

21. The plow of claim 20 wherein said plurality of closing wheels comprise a plurality of pairs of closing wheels, wherein a first pair of said wheels is at a greater distance apart than a second pair of said wheels.

22. The plow of claim 21 comprising at least two pairs of wheels and a final single compression roller.

23. The plow of claim 19 comprising weight of about 250 to about 500 pounds.

24. The plow of claim 19 further comprising a conduit line guide.

25. The plow of claim 24 wherein an upper portion of said conduit line guide is disposed at an angle of about 20 degrees to about 80 degrees with respect to a ground surface beneath said plow.

26. The plow of claim 25 wherein an upper portion of said conduit line guide is disposed at an angle of about 30 degrees to about 60 degrees with respect to the ground surface beneath said vibratory plow.

27. The vibratory plow of claim 24 further comprising conduit fed into said conduit line guide.

28. The vibratory plow of claim 27 wherein said conduit comprises a substantially rectangular or square cross-section.

29. The plow of claim 19 wherein at least one of said closing wheels is disposed substantially perpendicular to a ground surface.

30. The plow of claim 18 wherein at least one of said closing wheels is disposed at an angle to a ground surface.

31. The plow of claim 19 wherein at least one of said closing wheels is disposed substantially parallel with said vibratory plow blade.

32. The plow of claim 19 wherein at least one of said closing wheels is disposed at an angle to said vibratory plow blade.

33. A method for installing conduit beneath a ground surface comprising:
imparting vibrations from a self-contained, independently-operated, vibratory-plate compactor to a plow blade;
disposing the plow blade in the ground and moving the plow blade in a forwardly direction to create a trench in the ground;
disposing a conduit guide in the trench created by the plow blade; and
passing conduit through the conduit guide and into the trench.

34. The method of claim 33 further comprising at least partially closing at least a portion of the trench with one or more closing wheels.

35. The method of claim 33 wherein said plurality of closing wheels comprise a plurality of pairs of closing wheels, wherein a first pair of said wheels is at a greater distance apart than a second pair of said wheels.

36. The vibratory plow of claim 35 comprising at least two pairs of closing wheels and a final compression roller.

37. The method of claim 33 wherein the conduit comprises a substantially rectangular or square cross-section.

* * * * *